United States Patent [19]

Packo et al.

[11] 4,331,722
[45] May 25, 1982

[54] SEALING LEAKS BY POLYMERIZATION OF VOLATILIZED ORGANOSILANE MONOMERS

[75] Inventors: Joseph J. Packo, Austin, Tex.; Donald L. Bailey, Traverse City, Mich.

[73] Assignee: Packo Industries, Inc., Austin, Tex.

[21] Appl. No.: 217,412

[22] Filed: Dec. 11, 1980

[51] Int. Cl.$^3$ ............ B32B 35/00; F16L 55/10
[52] U.S. Cl. .................... 428/35; 48/194; 73/49.3; 106/33; 106/287.11; 138/97; 156/94; 166/294; 166/295; 252/374; 264/36; 405/264; 427/140; 427/142; 427/237; 427/248.1; 427/255.1; 427/255.2; 528/25; 556/429; 428/63
[58] Field of Search ............ 48/194; 73/49.3; 106/33, 287.11; 138/97; 156/94; 166/294, 295; 252/374; 264/36; 405/264; 427/140, 142, 237, 248.1, 255.1, 255.2; 428/63, 35; 528/25; 556/429

[56] References Cited

U.S. PATENT DOCUMENTS

| | | | |
|---|---|---|---|
| 2,259,875 | 10/1941 | Bent et al. | 166/294 X |
| 2,265,962 | 12/1941 | Bent et al. | 166/22 |
| 3,361,547 | 1/1968 | Packo | 48/193 |
| 3,483,735 | 12/1969 | Packo | 73/40.7 |
| 3,483,736 | 12/1969 | Anderson | 73/40.7 |
| 3,507,725 | 4/1970 | Hylak et al. | 156/94 |
| 3,523,771 | 8/1970 | Anderson | 48/193 |
| 3,572,085 | 3/1971 | Packo | 74/40.5 |
| 3,578,479 | 5/1971 | Packo | 138/97 X |
| 3,580,939 | 5/1971 | Ceyzeriat | 556/410 |
| 3,608,000 | 9/1972 | Anderson | 264/36 |
| 3,634,560 | 1/1971 | Anderson | 264/36 |
| 3,660,984 | 5/1972 | Anderson | 61/36 R |
| 3,709,712 | 1/1973 | Rossman | 138/97 X |
| 3,711,305 | 1/1973 | Anderson | 106/33 |
| 3,711,309 | 1/1973 | Packo | 264/36 X |
| 3,716,384 | 2/1973 | Anderson | 106/33 |
| 4,026,976 | 5/1977 | Anderson | 264/36 |
| 4,237,172 | 12/1980 | Packo et al. | 428/63 |
| 4,304,805 | 12/1981 | Packo et al. | 428/63 |

*Primary Examiner*—Edward C. Kimlin
*Assistant Examiner*—Robert A. Dawson
*Attorney, Agent, or Firm*—Browdy and Neimark

[57] ABSTRACT

Leaks in a vessel or pipeline or the like, adapted for containing a fluid, are sealed by means of a volatilized polymerizable organosilane comprising a mercaptosilane, an acyloxysilane, or an alkoxysilane taken on conjunction either with acetic acid anhydride or an amine, or mixtures thereof, the organosilane being supplied to the interior of the vessel or pipeline under sufficient pressure and for a sufficient period of time to permit contact and chemical reaction thereof in the presence of moisture or sand at the situs of the leak to provide a solid polysiloxane seal.

22 Claims, No Drawings

SEALING LEAKS BY POLYMERIZATION OF VOLATILIZED ORGANOSILANE MONOMERS

FIELD OF THE INVENTION

The present invention relates to sealing leaks in pipes, conduits, closed containers, tanks, and closed systems adapted to contain or transport fluids. The invention is particularly adapted for sealing leaks in buried pipes for conveying fuel gas and also for sealing leaks in telephone conduits containing nitrogen or other inert gases under pressure. This application contains subject matter related to that present in copending application Ser. No. 169,478 filed July 15, 1980, now U.S. Pat. No. 4,304,805 and its parent case, Ser. No. 966,327, filed Dec. 4, 1978, now U.S. Pat. no. 4,237,172.

BACKGROUND OF THE INVENTION

In an article entitled "Detection, Repair and Prevention of Gas Leaks," published in the American Gas Journal, August 1959, pages 16-28, it is indicated that the amount of fuel gas lost from pipelines through leakage represents a great economic burden as well as a potential safety hazard. In addition, leakage of fuel gas reduces the effective capacity of a gas distribution system. Another adverse effect of leakage is a reduction in the level of pressure in the distribution mains below desirable limits.

In U.S. Pat. No. 3,507,725 to Hylak et al, there is disclosed a method of repairing gas main fibrous packed joints with a liquid sealing material which may be a liquid monomer such as styrene monomer, by introducing the monomer into the gas main in liquid form, and permitting it to flow to a low point in the system where a leaking joint exists, the packing of which becomes saturated with the sealant which then polymerizes over a relatively long period of time, namely six weeks to three months. Styrene is employed as a liquid, and no specific catalyst is named in the patent.

The U.S. Pat. No. 3,578,479 to Packo discloses sealing leaks in a vessel and the like with a sealant agent which is either a silicon hydride, a boron hydride or an alkoxide borane, together preferably with a metal alkyl. To achieve best results from the disclosed components, this system requires the use of the metal alkyl, a dangerously pyrophoric material, as a catalyst and or a co-reactant. Moreover, such metal alkyls have a poor shelf life and are easily subject to contamination. The seal produced by the co-reaction has a tendency to be brittle and lacks consistency and homogeneity due to stratifications which inevitably occur in the mixtures and differences in volatility curves in the components which give different relative concentrations at different temperatures.

Likewise, U.S. Pat. No. 3,608,000 to Anderson discloses the introduction into a vessel of sealants which are mixtures of volatile organosilanes such as dimethyl diethoxy silane, trimethyl ethoxy silane, propyl trimethoxy silane and diisopropoxy dimethoxy silane; and metal alkyls which react chemically to form solid products in accordance with the equations set forth at column 2, lines 4-5 of the patent. These systems, which require the same metal alkyl catalyst and or co-reactants as discussed above, suffer the same disadvantages.

The Bent et al U.S. Pat. No. 2,265,962 discusses in general the use of liquid silanes for sealing wells by reaction of the silane with water to form an insoluble shield or plug. Among the silanes mentioned are some alkoxy silanes, but no mercapto silanes and no aryloxysilanes are shown. In general the compounds disclosed are either too unstable or too low in volatility to be practical for use in gas phase sealing, or they would need to be used with other compounds in a manner not disclosed by the patentees. Similarly, U.S. Pat. No. 2,259,875 to Bent et al, a division of the aforementioned Bent et al patent, also relates to a process for treating leaks in the walls of gas boreholes using liquid silane compounds.

The Ceyzerial U.S. Pat. No. 3,580,939 discloses the use of aminosilanes as cross-linking agents for diorganopolysiloxane compositions. These liquid compositions, which harden spontaneously in the presence of water, are suggested for joining slabs and pipes.

Anderson U.S. Pat. No. 4,026,976 shows the sealing of pipe leaks using a catalytically polymerizable volatile organic monomer, but this process undesirably shows the use of a catalyst such as a metal alkyl which consequently complicates the processing and increases the cost. Acrolein (acrylic aldehyde) catalyzed by $NH_3$ is suggested, as is isoprene catalyzed by triethyl aluminum.

In addition to the Anderson patents mentioned above, a number of other prior patents show the use of volatile mixtures for pipe sealing. These include the Anderson U.S. Pat. Nos. 3,634,560; 3,711,305; 3,716,384; Packo 3,578,479 and Anderson 3,660,984. Also of interest in this regard is the Rossman U.S. Pat. No. 3,709,712 which relates to the use of volatile organic amines; and Packo U.S. Pat. No. 3,711,309 which relates to the use of volatile alcohol or glycol ethers. Of somewhat less interest are the U.S. Pat. Nos. to Anderson 3,483,736; 3,523,771; Packo 3,483,735; 3,572,085; and 3,361,547 which relate to the detection of gas leaks.

In spite of all the work which has been done in the field of gas phase sealing, as noted above, most sealing of gas containing pipe continues to be carried out by archaically attempting to locate the leak, then excavating at the believed site of the leak, followed by applying a physical patch to the leak. Dogs are still being trained to sniff out gas leaks, although flame ionization is often used; these are both expensive techniques, and very often are unable to pinpoint the leak site, as gas may leak from one point and travel along the pipe for a considerable distance before reaching the surface where it can be detected. Also excavation is not only expensive but is impractical in some cases as where gas lines pass beneath large buildings.

Significant sealing problems also continue to occur in other gas containing conduits as well. Both aboveground and underground telephone conduits cannot tolerate moisture, as moisture tends to impregnate the dielectric material separating the telephone wires with the results that cross-talk occurs between adjacent lines; this problem is presently controlled at great expense by constantly feeding dry gas, e.g. nitrogen under pressure, through the telephone conduit. Problems of gas leakage also occur in many other environments including chemical processing plants and air conditioning units with resultant difficulties, and wherein repair may be expensive and inconvenient.

SUMMARY OF THE INVENTION

It is, accordingly, an object of the present invention to overcome deficiencies in the prior art, such as indicated above.

It is another object of the present invention to provide for the improved sealing of leaks in pipes, pipelines, conduits, tubing and vessels using gaseous mercaptosilanes or acyloxysilanes, each employed alone, by using gaseous alkoxysilanes in conjunction with acetic anhydride, or by using gaseous mixtures of alkoxysilanes and amines.

It is another object to provide for an improved process for sealing leaks in pressurized pipes, pipelines and vessels which provide a better seal, which is safer, and which uses materials which are stable and non-pyrophoric.

It is a further object to provide improved pipe seals which are more flexible and less brittle and therefore less likely to fail in the event of movement of the pipe, e.g. in the event of earth shifts, and which seal is more homogeneous.

It is yet a further object to provide for improved vessel sealing using a volatile, volatilizable or gaseous sealing compound which has good shelf life and is not easily contaminated.

It is yet another object of the present invention to provide a volatile, volatilized or gaseous sealing composition which may be used by itself and without the presence of a gaseous phyrophoric metal compound or a catalyst.

In accordance with the instant invention there is provided a novel process for sealing leaks in pipes, pipelines and pipe systems, conduits, closed containers, tanks, and closed systems such as air conditioner units adapted to contain gaseous fluids, all of which are referred to generally as a vessel. The process of the invention is particularly adapted for sealing leaks in underground piping systems used for conveying fuel gas; as well as for sealing leaks in telephone conduits containing nitrogen or other inert gas under pressure; air conditioner units, such as for automobiles, containing Freon; and other gaseous systems such as chemical plants and refrigeration units.

The invention not only eliminates leakage of gas into the atmosphere, but also into the surrounding soil or through joint packing materials. The air and the other surrounding materials which may be involved in the sealing operation are accordingly, referred to herein as the ambient environment.

The sealing method of the present invention is particularly adapted for the sealing of leaks in piping systems employing joints of the type sealed by fibrous packings, but it is not to be regarded as limited thereto. Fibrous packed joints are extensively employed in city gas distribution systems in which cas iron pipe sections are connected by bell-and-spigot-type joints caulked with fibrous packing, usually jute fiber. However, the method of the invention may also be employed for sealing small hole-type leaks, such as those caused by corrosion, in the body of the pipe sections. The seal as produced, because of its electrical insulating characteristics, also tends to retard further corrosion induced by electrical effects.

According to the invention, the sealant precursor is introduced into the interior of the vessel under pressure in gaseous form or in volatile liquid form, where it volatilizes within the vessel, at preferably ambient temperature. When the sealant compound begins to escape through any existing leak in the vessel, it reacts with soil or moisture present at the ambient exterior locus of the vessel where the leak exists and polymerizes to form a solid product in situ which seals the leak.

DETAILED DESCRIPTION OF THE INVENTION

The present invention employs the novel principle of sealing a leak in a vessel or pipeline or the like by introducing into the interior of the vessel in vapor form a normally gaseous or volatilizable or volatilized organosilane monomer which is capable of polymerizing in contact with materials in the environment such as moisture, soil or sand, or a combination of these agents. Polymerization is effected at the situs of the leak where, in contact with the polymerization inducing material, the monomer forms a solid polymeric product which acts as a seal.

Where desirable, the pipeline or vessel may be first flushed with an inert gas, before the monomer is introduced. The vapors of the organosilane monomer are preferably introduced in admixture with a gaseous vehicle or carrier which is inert to the monomer. The inert gaseous vehicle or the flushing gas may be, for example, nitrogen, helium, natural gas, or, in the case of air conditioning units, the Freon itself.

The concentration of monomer vapor employed will depend upon the type of monomer, the type of sealing problem present, the nature and size of the leaks, whether sealing is effected statically or dynamically, the environmental conditions of the vessel or pipeline, particularly the moisture level and the pressure and temperature of the carrier gas in the vessel, and the like. In general, the concentration of monomer will be on the order of about 100 to 50,000 parts per million, desirably 250 to 25,000 parts per million, preferably less than 10,000 ppm, and ideally less than 5,000 ppm, but this is to be considered as illustrative, and not as limiting.

The polymerization reaction may take place within a relatively short time, usually a matter of a few hours. On the other hand, when the sealing procedure is carrier out dynamically as described below, and the concentration of monomer in the system is maintained at less than 5,000 ppm as is most preferred, the process should be carried out over an extended period, e.g. a couple of months.

Thus, in accordance with one aspect of the practice of the invention, the organosilane is introduced into the vessel, in vapor form, or volatilizable liquid form, so as to reach in vapor form the points where leakage may be taking place. In the case of an underground pipeline or gas main, the leakage may be taking place at jute packed joints, or at corrosion sites, into the surrounding soil. In such cases a matrix of either jute or soil is available to absorb the organosilane vapors, providing a site for the polymerization to take place. The momomer is introduced into the vessel under a pressure sufficient to permit escape of its vapors from the leak into the ambient environment.

Sealing may be effected either statically or dynamically. Under static sealing methods, the part of the vessel (e.g. gas line) to be sealed is isolated from the remainder of the vessel, and such part is then purged of its contents by displacement with carrier gas under pressure and containing the organosilane vapor, it being understood that the carrier gas may be any gas inert to the organosilane, e.g. natural or fuel gas where the vessel is a gas line. Under appropriate conditions, preflushing or premoisturizing may first be carried out. After feeding of the carrier gas organosilane mixture, the infeed end of the vessel is closed, and the gas is permitted to leak from the leak holes, after which the vessel is tested for tightness. Static sealing may be repeated a plurality of times until the vessel is fully sealed. Static sealing may be faster and therefore preferred when the vessel is relatively small, e.g. a short length of pipeline.

However, dynamic sealing is usually preferred. This may be carried out by feeding the organosilane monomer continuously or intermittently into the vessel with the usual component carried by the vessel, e.g. natural or fuel gas as the carrier in the case of gas pipelines, or nitrogen as the carrier in the case of telephone conduits. Such feeding may be carried out in the same manner in which odorants are conventionally admixed with natural or fuel gas, e.g. by wicking, spraying or atomizing, or merely pumping the monomer in liquid form into the vessel where it then vaporizes with the flow of carrier gas. In such dynamic sealing carrier gas with organosilane vapor continues to leak through each leak hole until it becomes sealed.

Of course, where the vessel is a closed system, such as an air conditioning or refrigeration circuit, then the sealant organosilane gas is incorporated originally into the fluid components, e.g. Freon, in a concentration sufficiently high to effect sealing of any leaks which develop, but sufficiently low so that there is no substantial interference with the vaporization/liquification characteristics of the main fluid. Thus, in the case of a small closed system, such as an automobile air conditioning unit, the organosilane monomer is merely incorporated into the original fluid material, e.g. the Freon, in which case the unit will seal-seal as it develops leaks.

In many cases where the vessel is open, e.g. a gas line, polymerization will take place more effectively after the organosilane monomer has stopped flowing at the leak site, i.e. either static sealing or intermittent dynamic sealing. Therefore when dynamic sealing is called for, it may be desirable to add the organosilane intermittently, or alternatively with moistured carrier gas. Intermittent feeding may also be desirable from an economic viewpoint. In any event, the organosilane is supplied either continuously or for a period of time sufficient to allow polymer formation and the establishment of a solid seal at the situs of the leak. This point is usually indicated by a build-up of pressure within the vessel to a steady level.

When this system is employed to seal a pipeline, such as, for example, a gas main distribution system utilizing jute packed joints, there must be taken into consideration the mode of operation of the line. Some gas systems are used for transmission of dry natural gas, and in these the jute packing may have dried-out so that it is difficult for the organosilane to be reacted because of the lack of moisture. Also, where the pipeline is buried in very dry environments, a similar problem may exist. In such situations, in order to ensure the presence of adequate moisture at the location of the leak into the surrounding soil, it is desirable to pretreat the line by injection of moisture to the level needed to either render the packing absorptive of moisture or the soil surrounding the leak sufficiently moist to initiate hydrolysis and polymerization. Although most soils contain some moisture, under dry conditions it is desirable to introduce sufficient moisture into the system to assure proper polymerization conditions. However, moisture becomes less important where sufficient silica lies adjacent the leak hole.

Injection of the organosilane may be repeated as many times as required to reach a no-leak condition, e.g. a steady internal pressure indicative of sealing of leakage where static sealing is carried out.

As noted above, the sealant organosilane gas may be introduced intermittently, alternating with the feed of moisturized carrier gas. Where the carrier gas is natural or fuel gas, the organosilane can be introduced simultaneously with the odorants and in a similar manner. This system is particularly useful when it is desired to treat the entire gas distribution system simultaneously, for leaks as they develop. Where the organosilane is a mercaptosilane, the odorants normally used may be eliminated, as most of the mercaptosilanes have strong repulsive odors.

A key aspect of the present invention is the proper selection of a sealing compound. In accordance with the present invention, such a suitable material is an organosilane which is volatile at ambient temperatures and which is hydrolyzed and polymerized by contact with moisture or soil at the situs of the leak. These organosilanes may be selected from mercaptosilanes, acyloxysilanes, alkoxysilanes used in conjunction with acetic anhydride or the like, and mixture of alkoxysilanes and amines. These organosilanes and mixtures are in general desirable because they hydrolyze rapidly, have good volatility, form a strong polymeric seal, and in some cases are substantially non-corrosive. More particularly, the requirements of a sealing compound formed from such an organosilane reactant are as follows:

(1) the organosilane, and its co-reactant if any, must have sufficiently high vapor pressure at ambient temperature, i.e. at 30°–120° F., and the internal vessel pressure, to give gas mixtures containing at least 100 parts per million of the sealant vapor, when mixed with the carrier gas and preferably at least 200 parts per million of the organosilane vapor; and (2) The organosilane compound must be a monomer and be capable of hydrolyzing and polymerizing from the vapor state to form a solid silicone polymer or polysiloxane in the presence of moisture or soil.

It will be understood that mixtures of these organosilanes may be used, or even mixtures with other organosilanes such as aminosilanes as shown in related application Ser. No. 169,478, filed July 15, 1980, the contents of which are incorporated by reference, or less volatile organosilanes in small quantities. It must be understood, however, that the co-sealant should not be a dangerous pyrophoric material and should also meet requirements (1) and (2) immediately above, except that, as also mentioned above, small quantities of less volatile organosilanes may sometimes be used, so long as the mixture is volatile at the temperature and pressure of use. In general, it is desired that the organosilane or mixture be volatile at 30° F., i.e. at least 100 parts per million and preferable at least 200 parts per million in the gaseous atmosphere.

In addition, it is desirable that the volatile organosilane monomer and co-sealant also be environmentally acceptable. It is further desirable that such monomers be noncorrosive and sufficiently stable so that storage presents little difficulty. Suitable organosilanes are disclosed below:

I—Mercaptosilanes

A group of sealants which may be used are thio-esters formed from mercaptans, i.e. mercaptosilanes. Examples are dimethyl bis-(methyl-mercapto)silane; methyltris-(methylmercapto)silane; and amyl-tris-(methylmercapto)-silane.

In general mercaptosilanes and compositions thereof which have the right volatility and form effective seals on hydrolysis and polymerization are as follows:

1. $RSiH(SR')_2$;
2. $RSiH(SR')(OR'')$;
3. $RSi(SR')_3$;
4. $RSi(SR')_2(OR'')$;
5. $RSi(SR')(OR'')_2$, wherein R and R' are hydrocarbon (preferably alkyl) substituents of 1–5 carbon atoms, and R'' is $CH_3$— or $C_2H_5$—;
6. mixtures of $R_2Si(SR')_2$ and 1–99 mole % of the mercaptosilanes of (2), (3), (4), and (5) above;
7. mixtures of mercaptosilanes (2) through (5) above;
8. $RSi(SR')_2(NRR_1)$, wherein $R_1$ is a hydrocarbon (preferably alkyl) substituent of 1–5 carbon atoms or hydrogen;
9. $RSi(SR')(NRR_1)_2$;
10. $RSiH(SR')(NRR_1)$;
11. mixtures of $R_2SiH(SR')(NRR_1)$ and 1–99 mole % of the mercaptosilanes of (2) through (5) above or (8) through (10) above;
12. mixtures of (8), (9) or (10) with aminosilanes of the type disclosed in Ser. No. 966,327, or with mercaptosilanes (1) through (7) above.

In the components mentioned above, the R, R' and $R_1$ substituents preferably do not exceed 3 carbons.

The mercaptosilanes can be prepared by synthesis procedures known to those skilled in the art. The following reactions illustrate how they can be made:

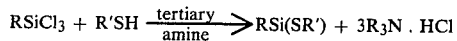

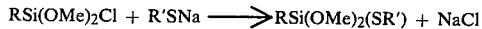

II-Acyloxysilanes

Acyloxysilanes which function as effective leak sealants are:

1. $RSi(OCR')_3$, where R is a hydrocarbon substituent of 1–5 carbon atoms and R' is methyl or halogen;

2. $RSi(OCR')_2(OR'')$, where R and R' are the same as above and R'' is methyl or ethyl;

3. $RSi(OCR')(OR'')_2$;

4. mixtures of $R_2Si(OCR')_2$ and 1–99 mole % of the acyloxysilanes of (1) and (3) above;

5. mixtures of acyloxysilanes (1) through (4) above;
6. mixtures of acyloxysilanes (1) through (4) above with mercaptosilanes of the type disclosed above.

Particularly suitable as leakage sealants are formoxysilanes, acetoxysilanes and acyloxysilanes containing both alkoxy- and acetoxy-substituents.

Acetoxysilanes are commercially available and their preparation is well known to silicone chemists. The better reactions are:

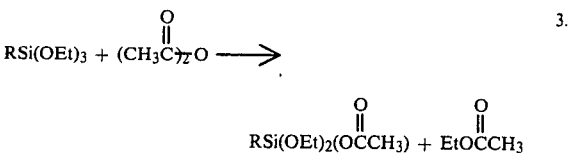

Acyloxysilanes are usable as sealants in environments where their organic acids, e.g. acetic acid, formyl acid, propionic acid, formed upon hydrolysis of the silane, can be tolerated.

III—Alkoxysilanes and Acetic Anhydride

The use of acetic anhydride-alkoxysilane mixtures can be considered to be an in situ reaction to produce acetoxysilanes which act as the sealant. If corrosion of metal surfaces due to the presence of organic acids (such as acetic acid) is not a problem, then the use of alkoxysilanes in conjunction with acetic anhydride provides an excellent sealant. The alkoxysilanes are readily available and acetic anhydride is a commodity chemical. Mixtures of alkoxysilanes and acetic anhydride react slowly according to the equations:

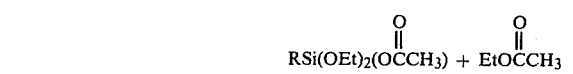

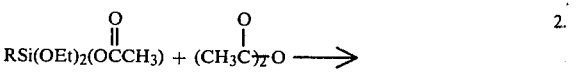

While complete reaction to remove all of the alkoxy substituents will not normally take place except with large excesses of acetic anhydride and/or under conditions of elevated temperatures, nevertheless significant advantages can be obtained over the use of acetoxysilanes, per se. First acetic anhydride-alkoxysilane mixtures are less costly and eliminate a synthesis of the acetoxysilane. In addition, acetic anhydride has a unique advantage in that it can make the silane sealant more effective. If traces of moisture are present in the gas the acetic anhydride will react with the moisture thereby preventing hyrolysis and polymerization of the silane inside the system. This, in effect, increases the amount of silane available for acting as a sealant at the source of the leak.

Suitable alkoxysilanes which can be used in conjunction with acetic anhydride as sealants are as follows:

1. $RSi(OR')_3$ + acetic anhydride, wherein R and R' are hydrocarbon (preferably alkyl) substituents containing 1–5 carbon atoms or phenyl or phenylethyl;

2. $R_2Si(OR')_2 + RSi(OR')_3 +$ acetic anhydride;
3. $RSiH(OR')_2 +$ acetic anhydride.

While the above compositions relate to alkoxysilanes prepared from alcohols with 3–5 carbon atoms, it is preferred that methoxysilanes and ethoxysilanes be employed. The alkoxysilanes are more reactive, not only with acetic anhydride but also with moisture. As a result they would be the most effective as sealants in conjunction with acetic anhydride.

The amount of acetic anhydride used with alkoxysilanes to obtain an effective silane sealant is not critical. Generally, however, it is preferable to use at least one mole of acetic anhydride for each mole of alkoxysilane employed. Larger amounts of acetic anhydride may be desirable particularly if the gas mixture contains moisture or if traces of water are present in the system.

While mixtures of alkoxysilanes and acetic anhydride can be prepared and used as mixed sealant compositions, depending on the reactivity of the alkoxysilane, this is not the most desirable method for introducing the sealant into the gas mixture. It is preferable to introduce the alkoxysilane (particularly, in the case of methoxysilanes) and the acetic anhydride into the system separately so as to eliminate any premature reactions which may occur during mixing. However, either method is effective in sealing leaks.

IV—Alkoxysilane and Amines

Because amines are weak bases they can catalyze the hydrolysis of alkoxysilanes, especially methoxysilanes, thereby improving their performance as silane sealants. Aminosilanes are highly effective for sealing leaks in natural gas systems and, as pointed out in Ser. No. 169,478 are also effective when used with alkoxysilanes. It is believed that aminosilanes improve alkoxysilanes because the former function as weak bases. Similarly, amines in mixtures with alkoxysilanes also function as weak bases.

The following compositions are pertinent:
1. $RSI(OR')_3 +$ amine, where R is a hydrocarbon substituent with 1–8 carbon atoms, and R' is methyl or ethyl;
2. $RSiH(OR')_2 +$ amine;
3. $R_2Si(OR')_2 + RSi(OR')_3 +$ amine.

The hydrocarbon substituent attached to the silicon atom may contain up to 5 carbon atoms or may be phenyl or phenylethyl which still have adequate volatility and, in the case of methoxy and ethoxysilanes, good reactivity.

The amines which are suitable in conjunction with alkoxysilanes are primary, secondary and tertiary aliphatic amines. Amines with base strengths stronger than ammonia are preferred. A further requirement is that the amine have sufficient volatility to be introduced into the gas phase in the sealing application; generally, amines with boiling points below 200° C. meet this requirement. On the other hand, many amines are highly flammable, and it is accordingly preferred to use those which are less flammable, e.g. those which are less volatile, such as diallylamine, triallylamine, d-n-butylamine, and di-n-amylamine.

The ratio of alkoxysilane to amine employed in the sealing application is not critical. Mixtures of amine to alkoxysilane ranging from 50–90 weight percent of each component can be used. However, amine concentrations of 5–30 weight percent of the mixture are preferred.

The following examples further illustrate without limiting the nature of the invention.

EXAMPLE 1

A $\frac{1}{2}'' \times 50''$ pipe having a plurality of holes therein is burried in wet sand. The pipe is then fogged by passing nitrogen gas through water and then through the pipe. This is followed by bubbing the nitrogen through a vessel containing dimethyl-bis-(methyl-mercapto)silane. The mercaptosilane at a concentration of approximately 500–1,000 ppm of the dynamic gas system is used in a 3-hour sealing.

EXAMPLE 2

The procedure of Example 1 is repeated using a mixture of methyl-tris-(methyl-mercapto)silane and amyl-tris-(methyl-mercapto)silane.

EXAMPLE 3

Example 1 is repeated using an acyloxysilane of the formula $CH_3Si(OCOCH_3)_3$. The procedure is repeated twice more, first with a mixture of the aforementioned acyloxysilane with a silane containing both alkoxy and acetoxy substituents of the formula $CH_3(OCOCH_3)_2(OCH_3)$; and second with the acyloxysilane mixed with a mercaptosilane of the formula $C_2H_5Si(SCH_2)_2(OCH_3)$.

EXAMPLE 4

Example 1 is again repeated, this time using a formoxysilane of the formula $C_2H_5Si(OCOH)_3$.

EXAMPLE 5

Example 1 is again repeated, this time passing into the pipe two streams of nitrogen, one of which passes through acetic anhydride and the other of which passes through a mixture of 6 parts by weight of vinyl trimethoxysilane and 1 part by weight of tetramethoxysilane.

EXAMPLE 6

Example 1 is repeated by passing the nitrogen gas through a mixture of methyl-dimethoxysilane and triallylamine, the mixture comprising 10% by weight of the amine and 90% by weight of the silane.

The instant invention has a number of advantages over the use of materials suggested prior to Ser. No. 966,327. The end product is better, more flexible and more homogeneous; the starting compounds are safer, more stable and non-pyrophoric. No gaseous organometallic compounds are necessary. The readily volatilizable compounds utilized form a leak sealing polymer under the proposed use conditions upon reaction with water or sand to form a self-leaking polysiloxane.

The foregoing description of the specific embodiments will so fully reveal the general nature of the invention that others can, by applying current knowledge, readily modify and/or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method of forming a seal at the situs of a leak in a vessel, conduit or the like, adapted for containing or transmitting a gaseous fluid therein, which method comprises introducing under pressure a sealant of a gaseous or ambient temperature volatilizable, polymerizable monomer or mixture of monomers into the interior of said vessel or conduit wherein, when the gaseous or volatilized monomer or monomer mixture escapes through a leak in the vessel or conduit, it reacts with the soil or moisture present at the ambient exterior locus of the vessel or conduit where the leak exists and polymerizes to form a solid product in situ which seals the leak, the improvement comprising using as the sealant a composition consisting essentially of a monomer or mixture of monomers of a polymerizable and hydrolyzable organosilane selected from the group consisting of: a mercaptosilane, an acyloxysilane, an alkoxysilane in combination with acetic anhydride, and an alkoxysilane with an amine and said organosilane or mixture thereof being sufficiently volatile at 20°–180° F. to give a vapor of at least 100 ppm in a carrier gas.

2. A method in accordance with claim 1, comprising, as a preliminary step, flushing said vessel with a moisture-laden gas inert to said sealant composition.

3. A method in accordance with claim 1, wherein said vessel is a pipe buried in sand.

4. A method in accordance with claim 1, wherein said vessel is a pipe buried in moist earth.

5. A method in accordance with claim 1, wherein said silane is carried in a gas inert thereto.

6. A method in accordance with claim 5, wherein said sealant composition is introduced into said vessel in a continuous manner at such a rate that the concentration of monomer vapor is in the range of 250–1,000 ppm.

7. A method in accordance with claim 1, carried out at a temperature of 30° F. to 120° F.

8. A method in accordance with claim 1, wherein said vessel is a natural or fuel gas pipe, and said organosilane is introduced into natural or fuel gas continuously carried by said gas pipe, in an intermittent manner.

9. A sealed vessel obtained by the method of claim 1.

10. A method in accordance with claim 1 wherein the mercaptosilane is selected from the group consisting of:
(1) $RSiH(SR')_2$;
(2) $RSiH(SR')(OR'')$;
(3) $RSi(SR')_3$;
(4) $RSi(SR')_2(OR'')$;
(5) $RSi(SR')(OR'')_2$;
(6) mixtures of $R_2Si(SR')_2$ and 1–99 mole % of the mercaptosilanes in (2, (3), (4) or (5));
(7) mixtures of mercaptosilanes (1) through (5);
(8) $RSi(SR')_2(NRR_1)$;
(9) $RSi(SR')(NRR_1)_2$;
(10) $RSiH(SR')(NRR_1)$; and
(11) mixtures of $R_2SiH(SR')(NRR_1)$ and 1–99 mole % of the mercaptosilanes in (2) through (5) or (8) through (10);
wherein R and R' are hydrocarbon radicals of 1–5 carbons, R'' is —CH$_3$ or —C$_2$H$_5$, and R$_1$ is H or hydrocarbon of 1–5 carbons or phenyl or phenylethyl.

11. A method in accordance with claim 10 wherein the mercaptosilane is amyl-tris-(methylmercapto)-silane, dimethyl-bis-(methylmercapto)silane, methyl-tris-(methylmercapto)-silane or a mixture of at least two of said mercaptosilanes.

12. A method in accordance with claim 1 wherein the acyloxysilane is selected from the group consisting of:

$$RSi(OCR')_3; \qquad (1)$$

$$RSi(OCR')_2(OR''); \qquad (2)$$

$$RSi(OCR')(OR'')_2; \qquad (3)$$

$$\text{mixtures of } R_2Si(OCR')_2 \text{ and 1–99 mole \% of the acyloxysilanes (1) or (3); and} \qquad (4)$$

(5) mixtures of acyloxysilanes (1) to (4); wherein R is a hydrocarbon substituent of 1–5 carbon atoms, R' is methyl or hydrogen, and R'' is methyl or ethyl.

13. A method in accordance with claim 12 wherein the acyloxysilane contains both alkoxy- and acetoxy- substituents.

14. A method in accordance with claim 12 wherein the acyloxysilane is a formoxysilane or an acetoxysilane.

15. A method in accordance with claim 14 wherein the acyloxysilane is acetoxysilane.

16. A method in accordance with claim 1 wherein the gaseous polymerizable monomer is an alkoxysilane taken in conjunction with either acetic anhydride or an amine.

17. A method in accordance with claim 16 wherein the alkoxysilane is used with acetic anhydride and is selected from the group consisting of:
(1) $RSi(OR')_3$;
(2) a mixture of $R_2Si(OR')_2$ and $RSi(OR')_3$; and
(3) $RSiH(OR')_2$; and wherein R and R' are hydrocarbon substituents containing 1–5 carbon atoms or phenyl or phenylethyl.

18. A method in accordance with claim 17 wherein the alkoxysilane is selected from the group consisting of methoxysilanes and ethoxysilanes.

19. A method in accordance with claim 16 wherein the alkoxysilane is used with an amine and is selected from the group consisting of:
(1) $RSi(OR')_3$;
(2) $RSiH(OR')_2$; and
(3) a mixture of $R_2Si(OR')_2$ and $RSi(OR')_3$; wherein R is a hydrocarbon substituent with 1–8 carbon atoms, and R' is methyl or ethyl.

20. A method in accordance with claim 19 wherein the alkoxysilane is either a methoxysilane or an ethoxysilane.

21. A method in accordance with claim 19 wherein the hydrocarbon substituent attached to the silicon atom of the alkoxysilane is either phenyl or phenylethyl.

22. A method in accordance with claim 19 wherein the amine is a primary, secondary or tertiary aliphatic amine possessing a boiling point below 200° C.

* * * * *

UNITED STATES PATENT AND TRADEMARK OFFICE
CERTIFICATE OF CORRECTION

PATENT NO. : 4,331,722

DATED : May 25, 1982

INVENTOR(S) : Joseph J. PACKO, et al

It is certified that error appears in the above-identified patent and that said Letters Patent are hereby corrected as shown below:

Title page, In the abstract, line 4 delete "on" and insert therefore --in--.

Column 8, line 43, the second formula should read as follows:

$$(CH_3\overset{\overset{O}{\|}}{C})_2 O$$

Column 10, line 51, delete "self-leaking" and insert therefore --self-sealing--.

Signed and Sealed this

Seventh Day of December 1982

[SEAL]

Attest:

GERALD J. MOSSINGHOFF

Attesting Officer — Commissioner of Patents and Trademarks